(12) United States Patent
West et al.

(10) Patent No.: US 9,868,461 B2
(45) Date of Patent: Jan. 16, 2018

(54) METHODS AND SYSTEMS FOR PERFORMING STEERING ALIGNMENT HEALTH CHECKS

(71) Applicant: GM GLOBAL TECHNOLOGY OPERATIONS LLC, Detroit, MI (US)

(72) Inventors: Marissa J. West, Hartland, MI (US); William R. Venner, III, Milford, MI (US); Scott R. Kloess, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 135 days.

(21) Appl. No.: 14/869,654

(22) Filed: Sep. 29, 2015

(65) Prior Publication Data

US 2017/0088163 A1    Mar. 30, 2017

(51) Int. Cl.
*B62D 6/00* (2006.01)
*G01M 17/00* (2006.01)
*B62D 5/04* (2006.01)
*G01M 17/06* (2006.01)

(52) U.S. Cl.
CPC ......... *B62D 5/0481* (2013.01); *B62D 5/0457* (2013.01); *G01M 17/06* (2013.01)

(58) Field of Classification Search
CPC .. B62D 5/0481; B62D 5/0457; B62D 5/0466; B62D 5/0493; G01M 17/06

USPC .................................................. 180/444, 446
See application file for complete search history.

(56) References Cited

U.S. PATENT DOCUMENTS

| | | | | |
|---|---|---|---|---|
| 5,795,997 A * | 8/1998 | Gittins | ................... | B62D 15/02 340/438 |
| 6,474,436 B1 * | 11/2002 | Konigorski | ............ | B62D 5/006 180/402 |
| 2002/0188389 A1 * | 12/2002 | Ashrafi | .................. | G01M 17/06 701/41 |
| 2003/0217885 A1 * | 11/2003 | Aoki | .................... | B62D 5/0466 180/446 |
| 2006/0000661 A1 * | 1/2006 | Daniel | ................. | B62D 5/0409 180/444 |
| 2012/0326424 A1 * | 12/2012 | Zaloga | ..................... | B62D 1/16 280/775 |
| 2013/0297150 A1 * | 11/2013 | Kim | ......................... | B62D 6/00 701/41 |

* cited by examiner

*Primary Examiner* — Tony H Winner
(74) *Attorney, Agent, or Firm* — Lorenz & Kopf, LLP

(57) ABSTRACT

Methods and systems are provided for monitoring a steering system of a vehicle. In one embodiment, a method includes: receiving torque signal data corresponding to torque signals received from a torque sensor associated with the steering system; processing the torque signal data to determine an average torque value; determining a health status of an alignment of the steering system based on the average torque value; and generating at least one of a signal, a message, and a code to notify a user based on the health status.

20 Claims, 3 Drawing Sheets

METHODS AND SYSTEMS FOR PERFORMING STEERING ALIGNMENT HEALTH CHECKS

TECHNICAL FIELD

The present disclosure generally relates to a steering system of a vehicle, and more particularly relates to methods and systems for monitoring steering alignment to determine a health of the steering system.

BACKGROUND

A steering system of a vehicle allows a driver to steer front wheels of the vehicle. The steering system may be an electric power steering system that uses an electric motor to provide a steering assist to a driver of the vehicle, thereby reducing effort by the driver in steering the vehicle.

In most vehicles, when the wheels are aligned straight, the steering wheel is oriented such that the spokes of the steering wheel appear level in a home or neutral position. In some instances, the steering wheel may become misaligned during vehicle assembly or in the field, that is, the spokes of the steering wheel are no longer in the home or neutral position. Noticeable deviations from the home or neutral position are typically undesirable to a driver.

In some instances, the steering wheel may be aligned, but the vehicle may become misaligned. For example, the steering wheel is no longer in the home or neutral position when the vehicle is traveling straight. Vehicle misalignment is typically undesirable to a driver.

Accordingly, it is desirable to provide methods and systems for monitoring the steering system for proper alignment. Furthermore, other desirable features and characteristics of the present invention will become apparent from the subsequent detailed description of the invention and the appended claims, taken in conjunction with the accompanying drawings and this background of the invention.

SUMMARY

Methods and systems are provided for monitoring a steering system of a vehicle. In one embodiment, a method includes: receiving torque signal data corresponding to torque signals received from a torque sensor associated with the steering system; processing the torque signal data to determine an average torque value; determining a health status of an alignment of the steering system based on the average torque value; and generating at least one of a signal, a message, and a code to notify a user based on the health status.

In one embodiment, a system includes an electric power steering system, a torque sensor associated with the electric power steering system, and a first module. The first module receives torque signal data corresponding to torque signals received from the torque sensor; processes the torque signal data to determine an average torque value; determines a health status of an alignment of the steering system based on the average torque value; and generates at least one of a signal, a message, and a code to notify a user based on the health status.

DESCRIPTION OF THE DRAWINGS

The present disclosure will hereinafter be described in conjunction with the following drawing figures, wherein like numerals denote like elements, and.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
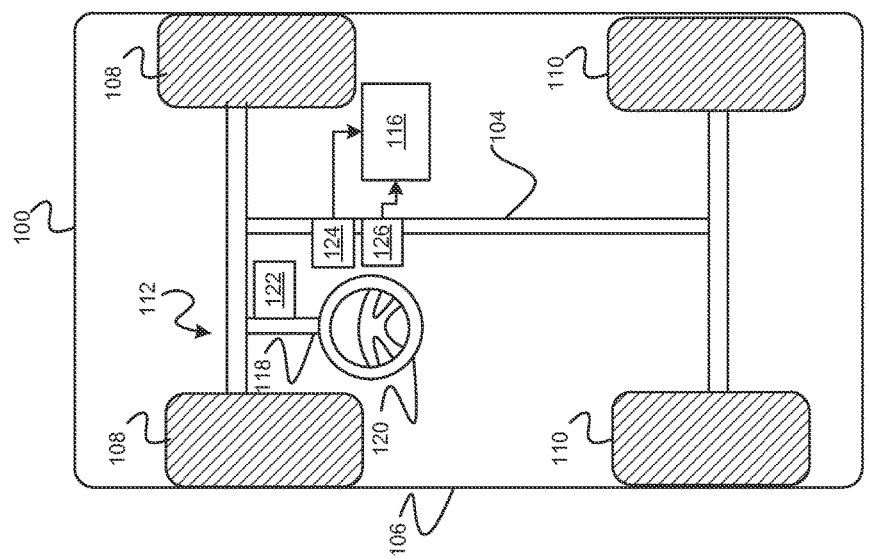
FIG. 1 is a functional block diagram of a vehicle that includes, among other features, a steering system in accordance with exemplary embodiments.

With reference to FIG. 1, a vehicle 100 is shown that includes a steering system 112 in accordance with various embodiments. Although the figures shown herein depict an example with certain arrangements of elements, additional intervening elements, devices, features, or components may be present in an actual embodiment. It should also be understood that FIG. 1 is merely illustrative and may not be drawn to scale.

As depicted in FIG. 1, the vehicle 100 generally includes a chassis 104, a body 106, front wheels 108, rear wheels 110, a steering system 112, and a monitoring module 116. The body 106 is arranged on the chassis 104 and substantially encloses the other components of the vehicle 100. The body 106 and the chassis 104 may jointly form a frame. The wheels 108-110 are each rotationally coupled to the chassis 104 near a respective corner of the body 106.

As can be appreciated, the vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and ethanol), a gaseous compound (e.g., hydrogen or natural gas) fueled engine, a combustion/electric motor hybrid engine, and an electric motor.

The steering system 112 includes a steering column 118 and a steering wheel 120. In various embodiments, the steering system 112 further includes various other column based or rack based features (not depicted in FIG. 1), such as, but not limited to, a steering gear, intermediate connecting shafts between the column and the gear, connection joints, either flexible or rigid, allowing desired articulation angles between the intermediate connecting shafts, and tie-rods. The steering gear, in turn, may comprise a rack, an input shaft, and an internal gearing.

In various embodiments, the steering system 112 is an Electric Power Steering system (EPS) that includes a motor 122 that is coupled to the steering system 112, and that provides torque or force to a rotatable or translational member of the steering system 112 (referred to as assist torque). The motor 122 can be coupled to the rotatable shaft of the steering column 118 or to the rack of the steering gear. In the case of a rotary motor, the motor 122 is typically connected through a geared or belt-driven configuration enabling a favorable ratio of motor shaft rotation to either column shaft rotation or rack linear movement. The steering system 112 in turn influences the steerable front road wheels 108 during steering based upon the assist torque received from the motor 122 along with any torque received from a driver of the vehicle 100 via the steering wheel 120. The steering system 112 further includes one or more sensors that sense observable conditions of the steering system 112. In various embodiments, the steering system 112 includes a torque sensor 124 and a position sensor 126. The torque sensor 124 senses a rotational torque applied to the steering system by for example, a driver of the vehicle 100 via the steering wheel 120 and generates torque signals based thereon. The position sensor 126 senses a rotational position of the steering wheel 120 and generates position signals based thereon.

The monitoring module 116 receives the sensor signals and monitors operation of the steering system 112 based thereon. The monitoring can be performed at a scheduled event, for example, during in-plant testing of the vehicle 100 (e.g., at DVT or other time), or at scheduled intervals during one or more drive cycles of the vehicle 100.

In general, the monitoring module 116 receives the torque sensor signals, and processes the torque sensor signals over a certain time period to determine a health of the alignment of the steering system 112. Based on the health of the alignment of the steering system, the monitoring module 116 generates one or more signals to notify a user of the health. For example, the monitoring module 116 notifies a user of the health by setting a diagnostic code or generating a message indicating the determined health. In such examples, the monitoring module 116 communicates the diagnostic code or message to a user through, for example, a technician tool (not shown) in communication with the vehicle 100, a telematics systems (not shown) of the vehicle 100 (e.g., OnStar, or other system), an infotainment system (not shown) of the vehicle 100, a dashboard (not shown) of the vehicle 100, or any other means associated with the vehicle 100 that can communicate with a user.

In another example, the monitoring module 116 generates one or more signals to modify or deactivate compensation methods that control one or more components of the vehicle 100. The compensation methods typically control one or more components of the vehicle 100 to compensate for detected activity that is a result of the misalignment, such as a lead or a pull in the steering system 112. The modification or deactivation of the compensation methods allows the user to physically feel the results of the misalignment through the steering system 112 (as opposed to masking the system results through compensation). The allowance of the user to physically feel the results is a form of notification of the misalignment. As can be appreciated, other techniques may be used to notify the user of the determined health in various other embodiments.

Figure 2:
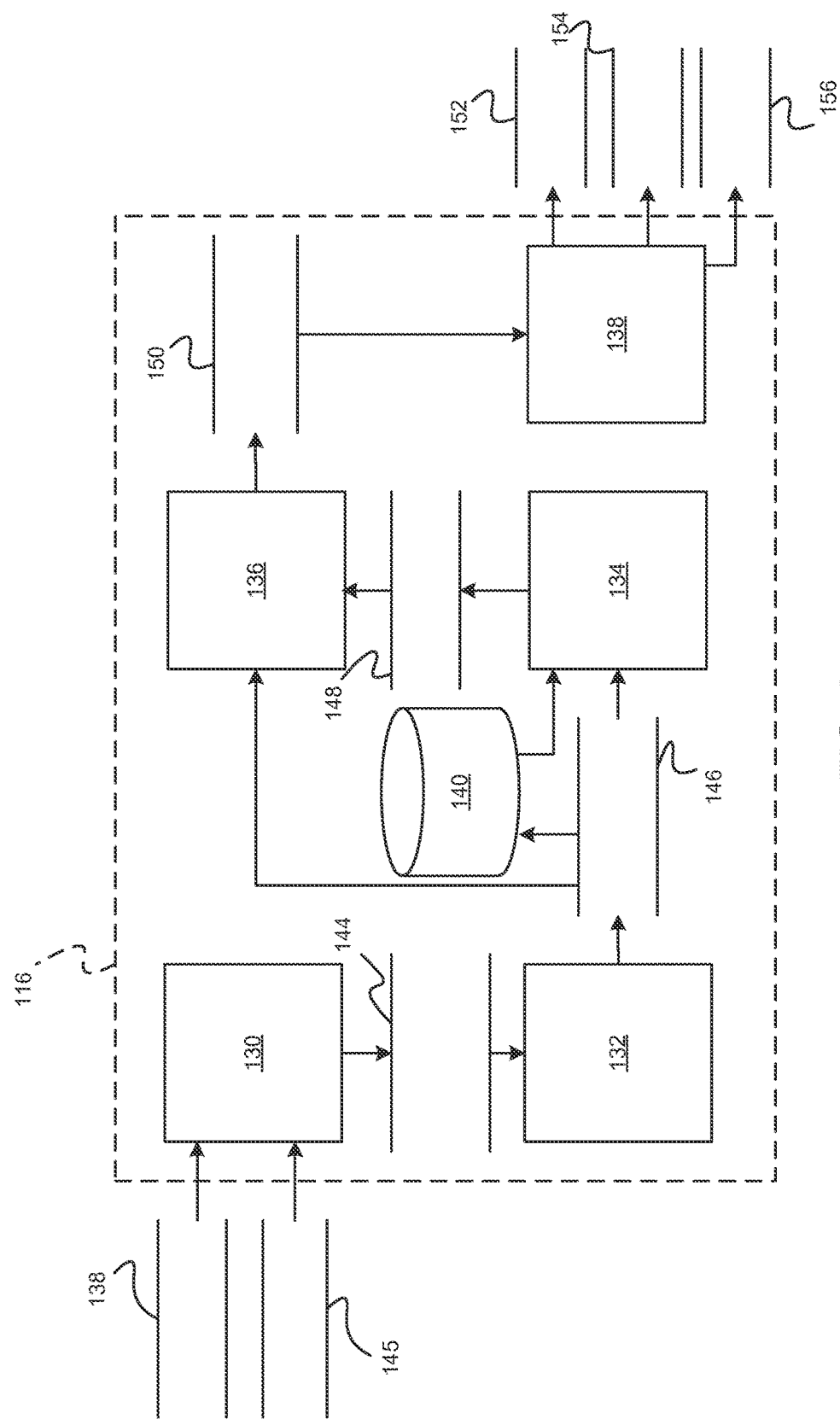
FIG. 2 is a functional block diagram of a vehicle that includes, among other features, a steering system and a monitoring system, in accordance with exemplary embodiments.

Referring now to FIG. 2 and with continued reference to FIG. 1, a dataflow diagram illustrates the monitoring module 116 of FIG. 1 in accordance with various embodiments. As can be appreciated, various embodiments of the monitoring module 116, according to the present disclosure, may include any number of sub-modules. For example, the sub-modules shown in FIG. 2 may be combined and/or further partitioned to similarly monitor the steering system 112. As discussed above, inputs to the monitoring module 116 may be received from the torque sensor 124 and/or other sensors of the vehicle 100, received from other modules of the vehicle 100, or determined by other sub-modules (not shown) of the monitoring module 116. In various embodiments, the monitoring module 116 includes a torque signal processing module 130, an average torque determination module 132, a long term torque average determination module 134, a health determination module 136, a notification module 138, and a torque average datastore 140.

The torque signal processing module 130 receives as input torque signal data 142 corresponding to the torque signal from the torque sensor 124. The torque signal processing module 130 processes the torque signal data 142 to determine torque values 144 indicating an amount of torque on the steering system 112.

In various embodiments, the torque signal processing module 130 further receives as input vehicle conditions data 145. For example, the torque signal processing module 130 receives the vehicle conditions data 145 when the monitoring is being performed while the vehicle driving on a road (as opposed to in-plant or other testing facility). The vehicle conditions data 145 indicates current operating conditions of the vehicle (e.g., steering angle, vehicle speed, lateral acceleration, yaw rate, etc.) and/or of the environment the vehicle is driving (e.g., road conditions, geographical location, etc.) The torque signal processing module 130 processes the torque signal data 142 based on the vehicle conditions data 145. For example, when certain vehicle conditions are occurring (i.e., certain driving maneuvers such as driving on a curve, or making a turn, or other maneuver), then the torque signal data 142 obtained during those conditions is excluded from the processing.

The average torque determination module 132 receives as input the torque values 144. The average torque determination module 132 computes an average torque value 146 of the torque values 144 over a pre-determined time period (e.g., one and a half to two minutes, or other time). The average torque determination module 132 stores the average torque value 146 in the torque average datastore 140.

In various embodiments, for example when monitoring while the vehicle 100 is driving on a road (as opposed to in-plant monitoring), the long term torque average determination module determines a long term torque average 148. For example, the long term torque average determination module 134 receives as input the average torque value 146. The long term torque average determination module 134 then retrieves X number of average torque values across Y number of key cycles stored in the torque average datastore 140 and computes the long term torque average 148 from the retrieved average torque values and the received average torque value 146.

The health determination module 136 receives as input the average torque value 146 or the long term torque average 148 depending whether the monitoring is being performed while the vehicle 100 is driving on a road or in-plant. The health determination module 136 evaluates the average torque value 146 or the long term torque average 148 to determine a health status 150 of the steering alignment. For example, when the monitoring is occurring while the vehicle 100 is in a plant, the health determination module 136 compares the average torque value 146 to a threshold value associated with the plant. If the average torque value 146 is greater than the threshold value, then the health status 150 of the steering alignment is set to indicate that the steering system 112 is in alignment. If, however, the average torque value 146 is less than the threshold value, then the health status 150 of the steering alignment is set to indicate that the steering system 112 is considered to be miss-aligned.

For example, when the monitoring is occurring while the vehicle 100 is driving on the road, the health determination module 136 compares the long term torque average 148 to a threshold value associated with the road. If the long term torque average 148 is greater than the threshold value, then the health status 150 of the steering alignment is set to indicate that the steering system 112 is in alignment. If, however, the long term torque average 148 is less than the threshold value, then the health status 150 of the steering alignment is set to indicate that the steering system 112 is considered to be miss-aligned.

In various embodiments, the threshold values are predetermined for a particular vehicle type, a particular steering type, and/or based on various driving conditions. In various embodiments, multiple threshold values can be determined based on a condition that occurs as a result of miss-alignment.

The notification module 138 receives as input the health status 150. The notification module 138 generates one or more notification signals 152, messages 154, and/or codes 156 based on the health status 150.

Figure 3:
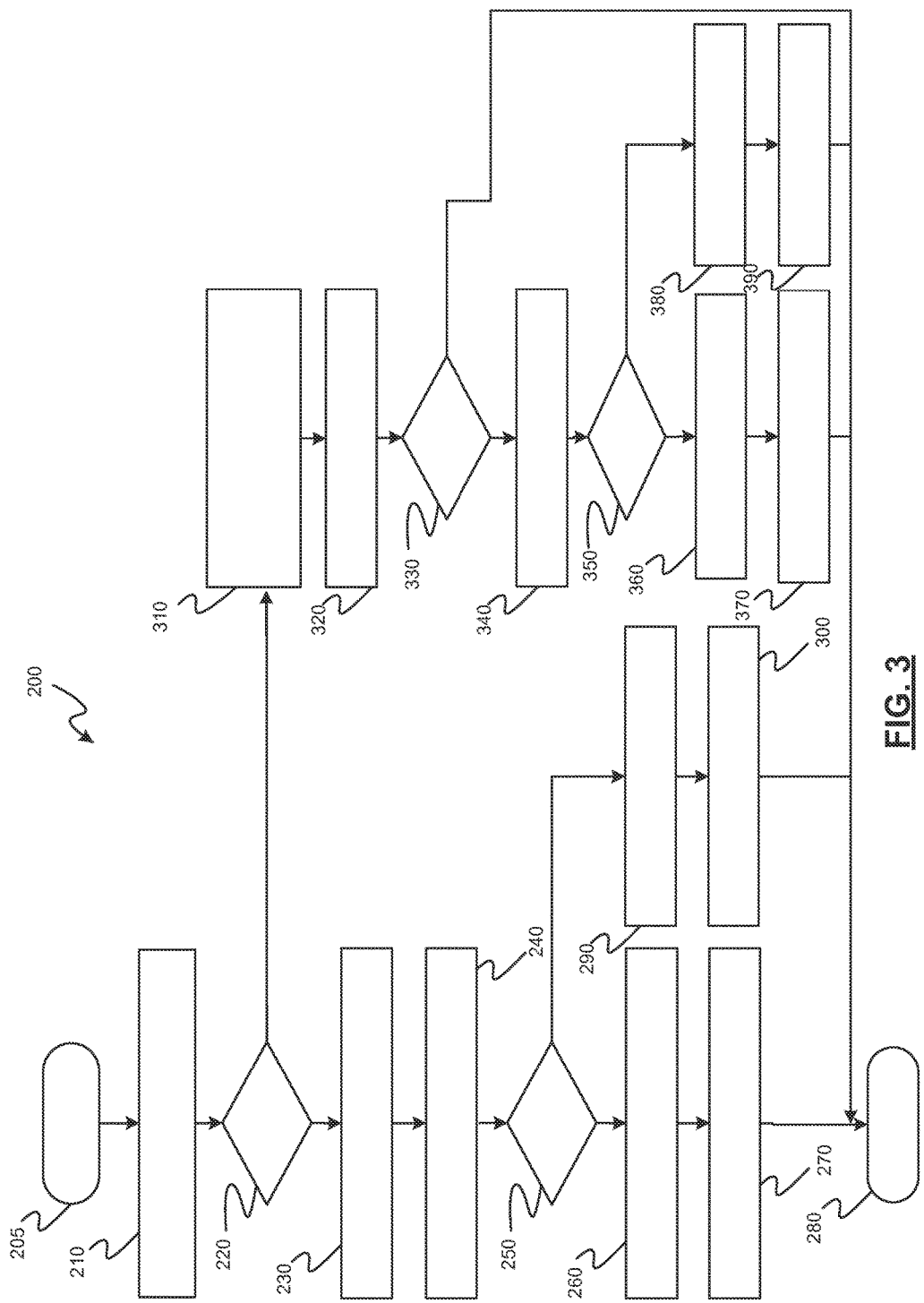
FIG. 3 is a flowchart of a method of monitoring the steering system in accordance with exemplary embodiments.

With reference now to FIG. 3, a flowchart of a method 200 for monitoring the steering system is shown in accordance with exemplary embodiments. The method 200 can be utilized in connection with the vehicle 100 and the monitoring system 128, in accordance with exemplary embodiments. As can be appreciated in light of the disclosure, the order of operation within the method is not limited to the sequential execution as illustrated in FIG. 3, but may be performed in one or more varying orders as applicable and in accordance with the present disclosure.

As depicted in FIG. 3, the method may begin at 205. At 210, the torque signal data 142 is received. It is determined whether the monitoring is being performed in-plant at 220. If the monitoring is being performed in-plant (e.g., at DVT or some other time) at 220, the torque signal data 142 is processed to determine an average torque value 146 at 230. The average torque value 146 is stored at 240 and evaluated at 250.

If, at 250, the average torque value 146 is less than a threshold associated with the in-plant monitoring, the health status 150 is set to indicate that the steering system 112 is in alignment at 260 and optionally one or more notification signals 152, messages 154, and/or codes 156 are generated to indicate the health status 150 to a user at 270. Thereafter, the method may end at 280.

If, however, the average torque value 146 is greater than the threshold associated with in-plant monitoring at 250, the health status 150 is set to indicate that the steering system 112 is miss-aligned at 290, and one or more notification signals 152, messages 154, and/or codes 156 are generated to indicate the health status 150 to a user at 300. Thereafter, the method may end at 180.

If, at 220, it is determined that the monitoring is not in-plant, the torque signal data 142 is processed to determine an average torque value 146 at 310. In processing the torque signal data 142 at 310, vehicle conditions data 145 is evaluated and torque signal data 142 associated with certain driving conditions is excluded. For example, torque signal data 142 associated with a driving maneuver that is not a straight maneuver is excluded. The average torque value 146 of the remaining torque signal data 142 is stored at 320 and evaluated at 330.

For example, if X number of average torque values 146 has not yet been stored across X key cycles at 330, then the method may end at 280. If, however, X number of average torque values 146 has been stored across X key cycles at 330, then the long term torque average 148 is determined from the X number of average torque values 146 at 340 and evaluated at 350. If the long term torque average 148 is less than a threshold associated with road testing at 350, the health status 150 is set to indicate that the steering system 112 is in alignment at 360, and optionally one or more notification signals 152, messages 154, and/or codes 156 are generated to indicate the health status 150 to a user at 370. Thereafter, the method may end at 180.

If, however, the long term torque average 148 is greater than the threshold associated with road testing at 350, the health status 150 is set to indicate that the steering system 112 is miss-aligned at 380, and one or more notification signals 152, messages 154, and/or codes 156 are generated to indicate the health status 150 to a user at 390. Thereafter, the method may end at 180.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of monitoring a steering system of a vehicle, comprising:
   receiving torque signal data corresponding to torque signals received from a torque sensor associated with the steering system;
   processing the torque signal data over a time period to determine an average torque value;
   determining a health status of an alignment of the steering system based on the average torque value; and
   generating at least one of a signal, a message, and a code to notify a user based on the health status.

2. The method of claim 1, further comprising receiving vehicle conditions data, and wherein the determining the average torque value is based on the vehicle conditions data.

3. The method of claim 1, wherein the vehicle conditions data indicates current operating conditions of the vehicle.

4. The method of claim 1, wherein the vehicle conditions data indicates current conditions of an environment the vehicle is driving.

5. The method of claim 1, wherein the at least one of the signal, the message, and the code deactivates a steering compensation system, the deactivation of the steering compensation system notifies the user through feedback from the steering system.

6. The method of claim 1, wherein at least one of the signal, the message, and the code activates a notification device to notify the user.

7. The method of claim 1, further comprising determining an average torque value X number of times across Y key cycles, wherein the determining the average torque value is based on the X number of average torque values across the Y key cycles.

8. The method of claim 1, wherein the determining the average torque value X number of times across Y key cycles is based on whether the vehicle is driving in a test environment or on a road.

9. The method of claim 1, wherein the health status of the steering system indicates at least one of aligned and miss-aligned.

10. The method of claim 1, wherein the determining the health status is based on a comparison of the average torque value to a predetermined threshold, wherein a value of the predetermined threshold is based on at least one of a particular vehicle type, a particular steering type, a driving condition, and a result of steering miss-alignment.

11. A system, comprising:
an electric power steering system;
a torque sensor associated with the electric power steering system; and
a first module that receives torque signal data corresponding to torque signals received from the torque sensor, that processes the torque signal data over a time period to determine an average torque value, that determines a health status of an alignment of the steering system based on the average torque value, and that generates at least one of a signal, a message, and a code to notify a user based on the health status.

12. The system of claim 11, wherein the first module receives vehicle conditions data, and determines the average torque value based on the vehicle conditions data.

13. The system of claim 11, wherein the vehicle conditions data indicates current operating conditions of the vehicle.

14. The system of claim 11, wherein the vehicle conditions data indicates current conditions of an environment the vehicle is driving.

15. The system of claim 11, wherein the at least one of the signal, the message, and the code deactivates a steering compensation system, the deactivation of the steering compensation system notifies the user through feedback from the steering system.

16. The system of claim 11, wherein at least one of the signal, the message, and the code activates a notification device to notify the user.

17. The system of claim 11, wherein the first module determines an average torque value X number of times across Y key cycles, and determines the average torque value based on the X number of average torque values across the Y key cycles.

18. The system of claim 11, wherein the first module determines the average torque value X number of times across Y key cycles based on whether the vehicle is driving in a test environment or on a road.

19. The system of claim 11, wherein the health status of the steering system indicates at least one of aligned and miss-aligned.

20. The system of claim 11, wherein the first module determines the health status based on a comparison of the average torque value to a predetermined threshold, wherein a value of the predetermined threshold is based on at least one of a particular vehicle type, a particular steering type, a driving condition, and a result of steering miss-alignment.

* * * * *